(12) United States Patent
Sahu

(10) Patent No.: US 8,792,189 B2
(45) Date of Patent: Jul. 29, 2014

(54) PERSONAL MEDIA VIEWING DEVICE

(71) Applicant: Bibek Sahu, West Des Moines, IA (US)

(72) Inventor: Bibek Sahu, West Des Moines, IA (US)

(*) Notice: Subject to any disclaimer, the term of this patent is extended or adjusted under 35 U.S.C. 154(b) by 0 days.

(21) Appl. No.: 13/752,322

(22) Filed: Jan. 28, 2013

(65) Prior Publication Data

US 2013/0194682 A1 Aug. 1, 2013

Related U.S. Application Data

(60) Provisional application No. 61/590,906, filed on Jan. 26, 2012.

(51) Int. Cl.
*G02B 27/02* (2006.01)
*G02B 7/02* (2006.01)

(52) U.S. Cl.
USPC .......................................... 359/804; 359/815

(58) Field of Classification Search
USPC .......................................... 359/811–830, 804
See application file for complete search history.

(56) References Cited

U.S. PATENT DOCUMENTS

| | | | |
|---|---|---|---|
| 4,198,114 A * | 4/1980 | Zapp | 359/376 |
| 6,947,014 B2 | 9/2005 | Wooten | |
| 7,145,726 B2 | 12/2006 | Geist | |
| 7,529,042 B2 | 5/2009 | Losee | |
| 7,791,806 B2 * | 9/2010 | Moliton et al. | 359/630 |
| 2003/0184868 A1 | 10/2003 | Geist | |
| 2005/0174651 A1 | 8/2005 | Spitzer et al. | |
| 2006/0052146 A1 | 3/2006 | Ou | |
| 2008/0074616 A1 | 3/2008 | Jutamulia | |
| 2008/0278821 A1 | 11/2008 | Rieger | |
| 2009/0320083 A1 | 12/2009 | Dajani | |
| 2010/0066976 A1 | 3/2010 | Richards et al. | |
| 2010/0277575 A1 | 11/2010 | Ismael et al. | |
| 2010/0289725 A1 | 11/2010 | Levine | |
| 2011/0098083 A1 | 4/2011 | Lablans | |
| 2011/0273613 A1 | 11/2011 | Chavez et al. | |

* cited by examiner

*Primary Examiner* — Mohammed Hasan
(74) *Attorney, Agent, or Firm* — Mark David Torche; Patwrite LLC

(57) ABSTRACT

A personal media viewing device has a frame that adjustably holds a pair of lenses. The frame has tracks along a bottom inside portion that guides the lenses as a lens adjustment knob is turned. The adjustment knob is attached to a translating screw shaft that has opposingly threaded portions that interact with a left and right traveling nut attached to each lens and moves each lens in an opposite direction. An elastic strap is used to removably hold a personal media device to the frame and a head attachment portion is provided to allow a user to operate the personal media viewing device hands free. The adjustment knob allows a user to adjust the lenses to an off-axis position selected to reduce eyestrain, headaches and other non-desirable effects associated with viewing a device in front of the user's eyes.

12 Claims, 18 Drawing Sheets

PERSONAL MEDIA VIEWING DEVICE

CROSS REFERENCE TO RELATED APPLICATIONS

This application claims priority and herein incorporates by reference U.S. provisional patent application 61/590,906, filed Jan. 26, 2012.

BACKGROUND OF THE INVENTION

Smart phone use and other personal media devices such as mp3 players, tablet computers, etc. are becoming an indispensable part of our modern lifestyle. Over 35% of Americans use smartphones alone and the use of personal media devices is expected to grow even higher.

Most of today's personal media devices play movies and games, stream television and surf the web. In addition, many of these devices are now offering 3-D viewing without using special glasses. While it is very convenient to have so much information and entertainment at our fingertips, viewing these devices can be less than satisfying, especially if the user does not have perfect vision. Although screen size and resolution is improving, by its very definition, there is a limit on the size of a personal media device. Additionally, many people experience significant eye-strain when viewing these devices.

There is a need for a device that allows all users to view personal media devices comfortably and enjoyably while minimizing eye-strain.

SUMMARY OF THE INVENTION

A personal media viewing device has a frame that adjustably holds a pair of lenses. The frame has tracks along a bottom inside portion that guides the lenses as a lens adjustment knob is turned. The adjustment knob is attached to a translating screw shaft that has opposingly threaded portions that interact with a left and right traveling nut attached to each lens and moves each lens in an opposite direction. An elastic strap is used to removably hold a personal media device to the frame and a head attachment portion is provided to allow a user to operate the personal media viewing device hands free. The adjustment knob allows a user to adjust the lenses to an off-axis position selected to reduce eyestrain, headaches and other non-desirable effects associated with viewing a device in front of the user's eyes.

Other features and advantages of the instant invention will become apparent from the following description of the invention which refers to the accompanying drawings.

DETAILED DESCRIPTION OF THE INVENTION

Figure 1:
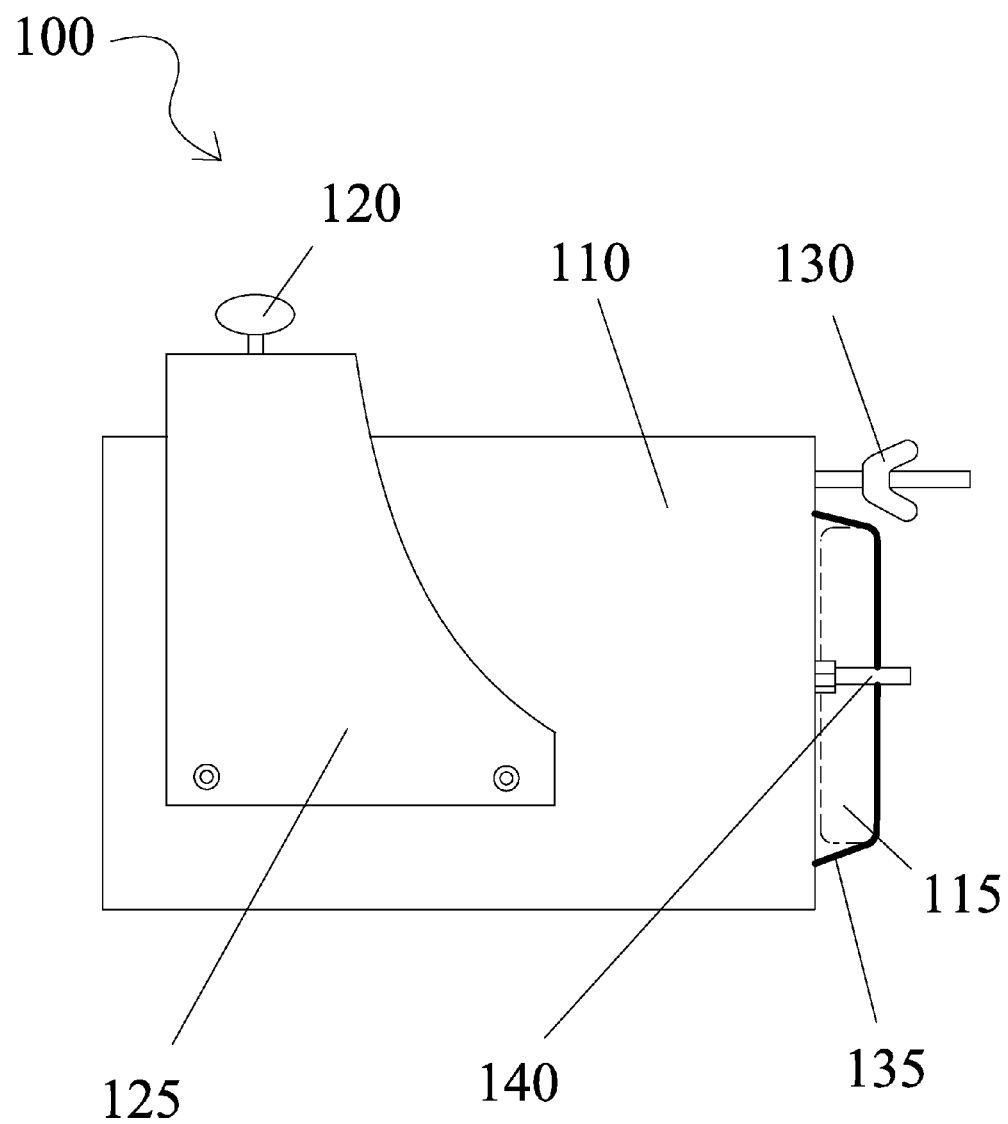
FIG. 1 is a side view of a personal media viewing device according to an embodiment of the invention.
Figure 2:
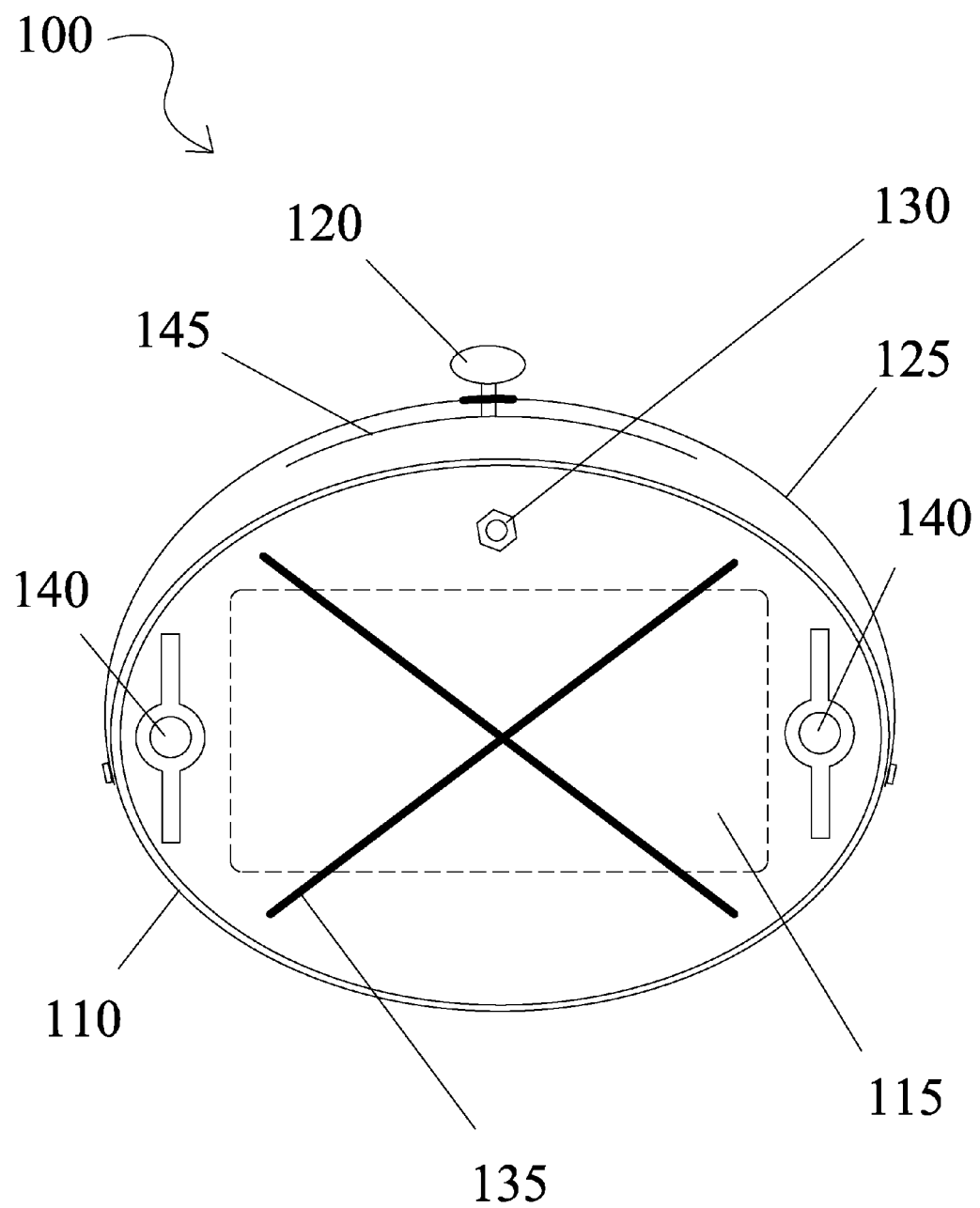
FIG. 2 is a front view of the personal media viewing device shown in FIG. 1.
Figure 3:
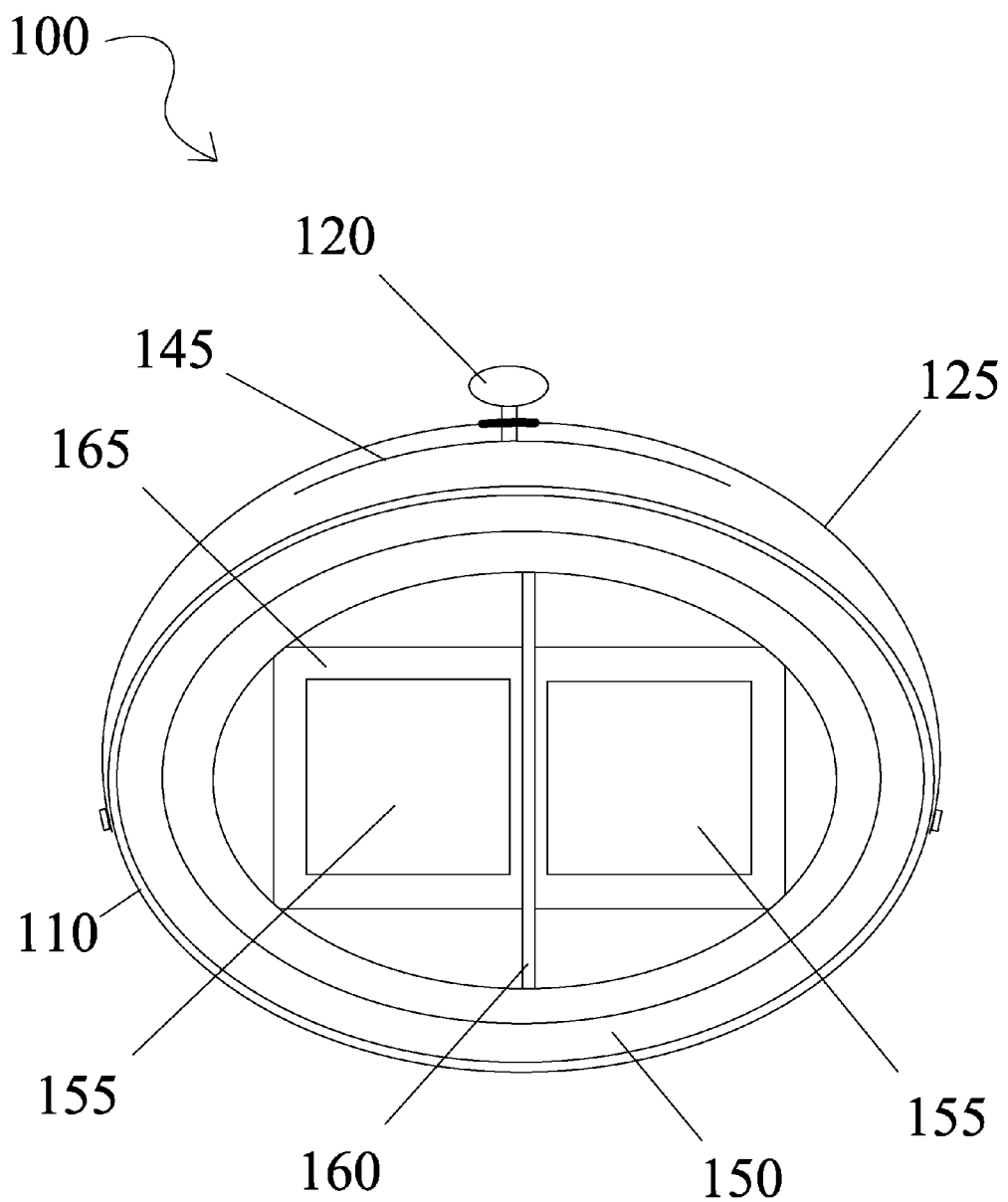
FIG. 3 is a rear view of the personal media viewing device shown in FIG. 1.
Figure 4:
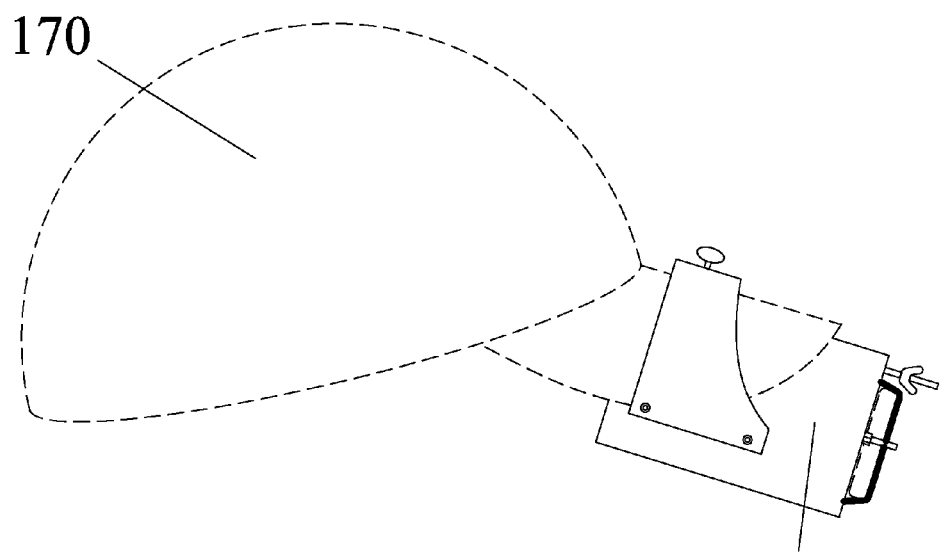
FIG. 4 is a side view of the personal media viewing device shown in FIG. 1 attached to a cap.
Figure 5:
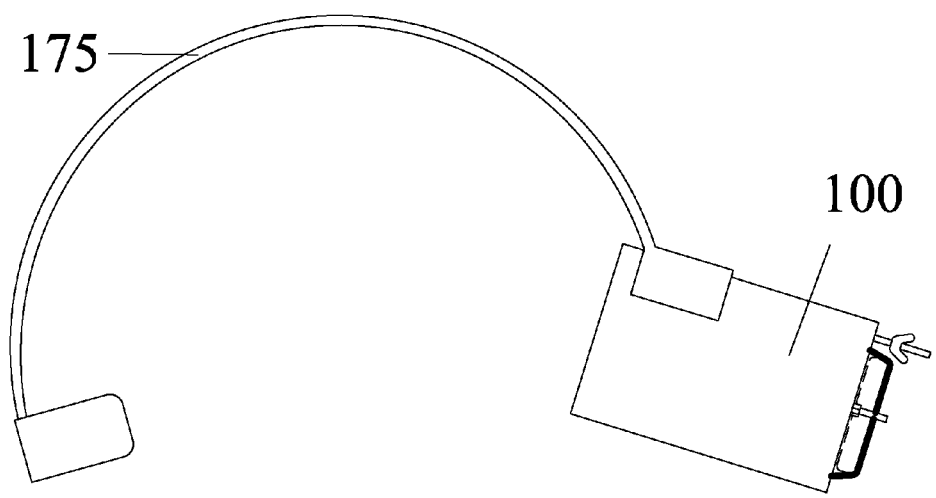
FIG. 5 is a side view of the personal media viewing device shown in FIG. 1 attached to a head attachment.
Figure 6A:
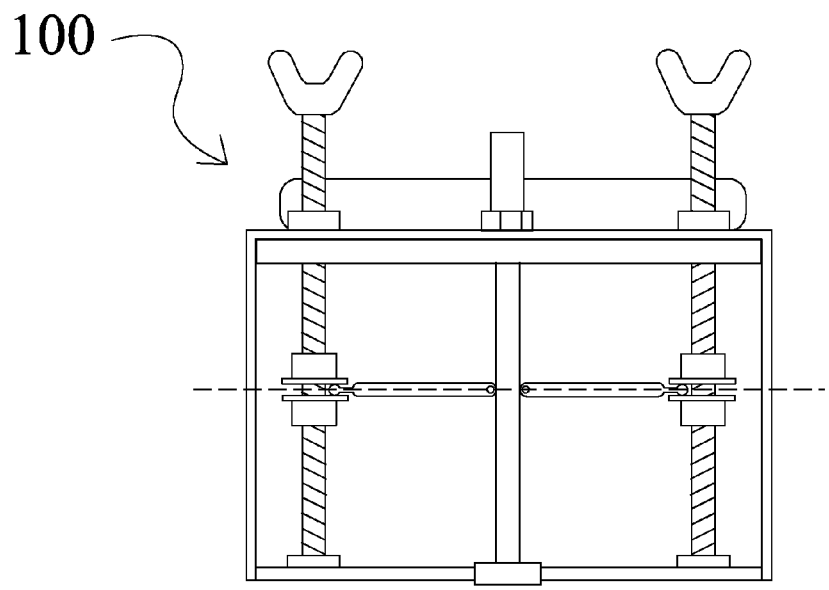
FIG. 6A is a top cutaway view of the personal media viewing device shown in FIG. 1.
Figure 6B:
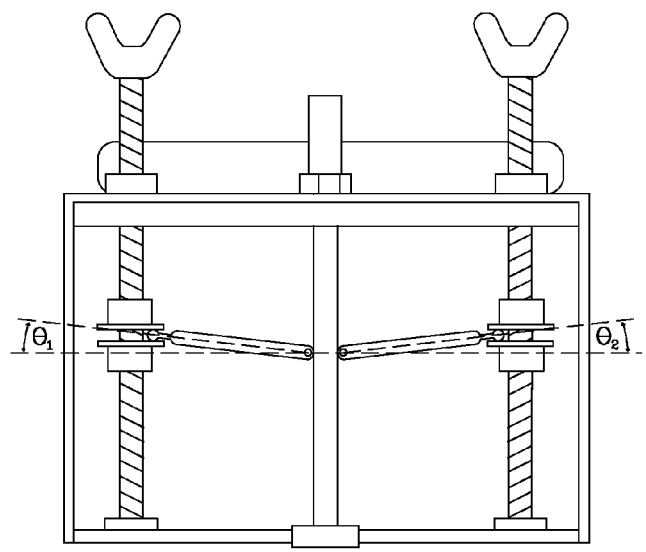
FIG. 6B is a top cutaway view of the personal media viewing device shown in FIG. 1.

In the following detailed description of the invention, reference is made to the drawings in which reference numerals refer to like elements, and which are intended to show by way of illustration specific embodiments in which the invention may be practiced. It is understood that other embodiments may be utilized and that structural changes may be made without departing from the scope and spirit of the invention.

Referring to FIGS. 1 through 6A and 6B, a personal media viewing device 100 is shown having a frame 110 that allows a user to attach a personal media device 115 using an attachment strap 135. Attachment strap 135 is elastic and removably holds personal media device 115 snugly in place during use. Of course other temporary holding means may also be used such as clips (not shown), posts with rotating clip, slide track, etc. as long as personal media device 115 is held in place during use, while allowing removal. Additionally, the holding means adjusts to accommodate different size devices.

A guide post 140 is provided to align lens 155 and to add structural stability. Adjustment screws 130 are provided to allow a user to adjust focal distance from lens 155 and user's eyes (not shown). Adjustment screws 130 may also be used to deflect lens 155 by a selected angle $\theta_1$ and $\theta_2$ which can reduce eyestrain.

An attachment clip 125 is used to attach personal media viewing device 100 to a cap 170 or other head attachment portion 175 which allows hands free use. An attachment screw 120 clamps personal media viewing device 100 to cap 170 or head attachment portion 175 and is removable. A clamp portion 145 moveably makes contact with the bill of cap 170.

To enable and enhance 3D devices and viewing, a divider 160 is provided to keep the two slightly different images from blending together. Divider 160 may be removable to enhance non-3D use and some autostereoscopic devices. Additionally, divider 160 may be hingedly attached and flip in and out of position (not shown) to facilitate its use. A frame 165 holds lenses 155. This allows lens 155 to adjust. In use, the user wears a head attachment 175 (or cap 170) which allows hands free viewing of the content delivered to personal media device 115. This provides a virtual viewing size that is enjoyable and satisfactory for most users. A hood gasket 150 is used to protect and seal the device from outside contamination.

Figure 7:
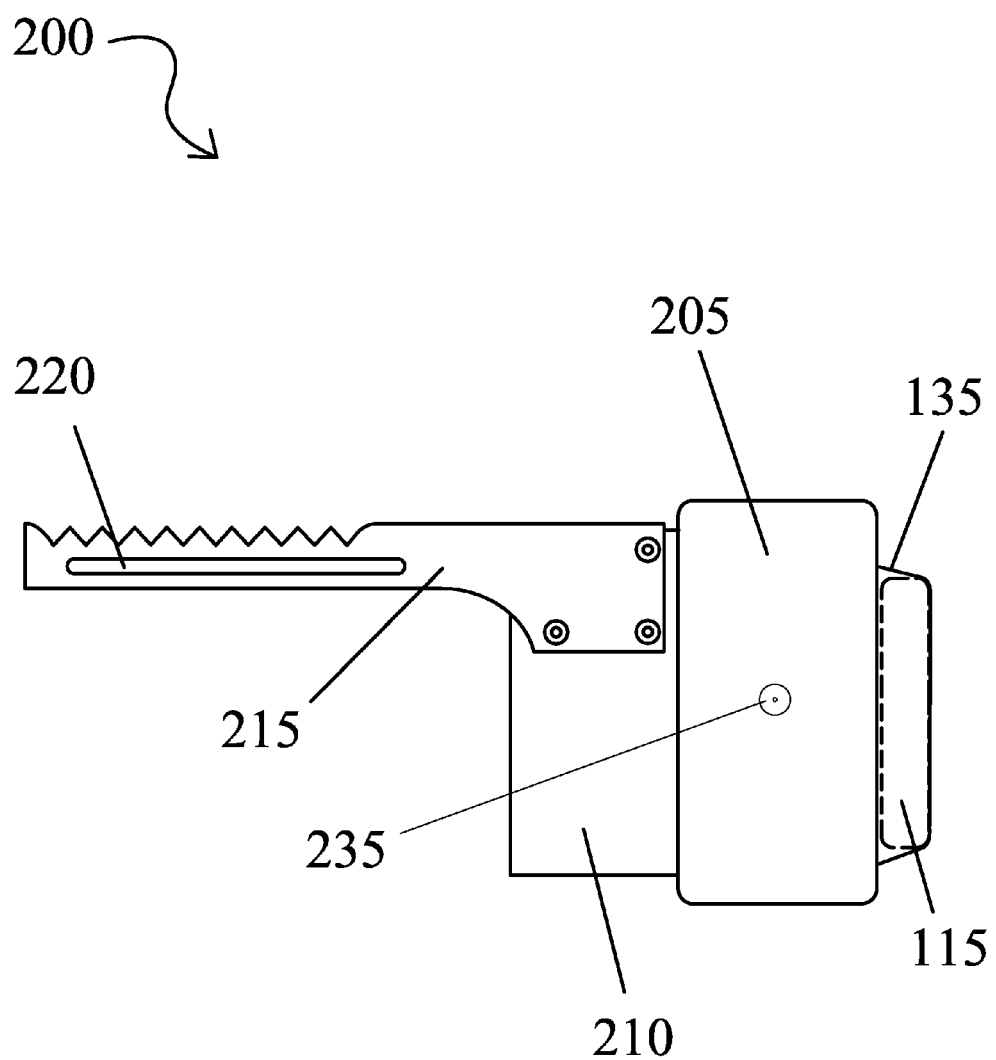
FIG. 7 is a side view of a personal media viewer according to an embodiment of the invention.
Figure 8:
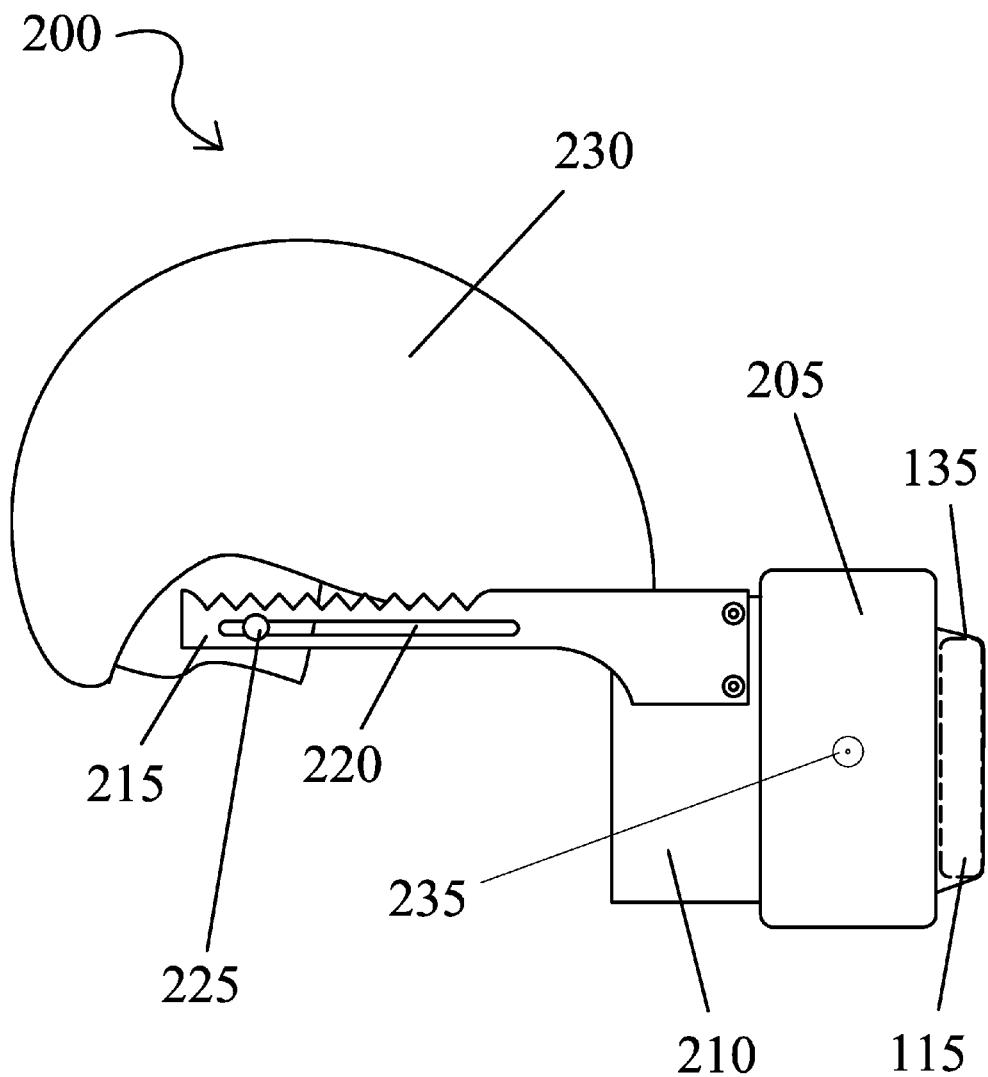
FIG. 8 is a side view of the personal media viewing device shown in FIG. 7 attached to a helmet.

Referring now to FIGS. 7 and 8, a personal media viewing device 200 is shown having a hood cap 205 which telescopically fits over hood 210. Hood cap 205 moves to allow the user to adjust the viewing distance between personal media device 115 and the user's eyes (not shown). An adjustment bracket 215 is used to adjustably attach personal media viewing device 200 to a headgear portion 230. Although headgear portion 230 is shown as a helmet, other head attachments may be used as long the user is able to operate personal media viewing device 200 in a hands free mode. An adjustment pin 225 fits within an adjustment slot 220 to further customize the fit to the user.

Figure 9A:
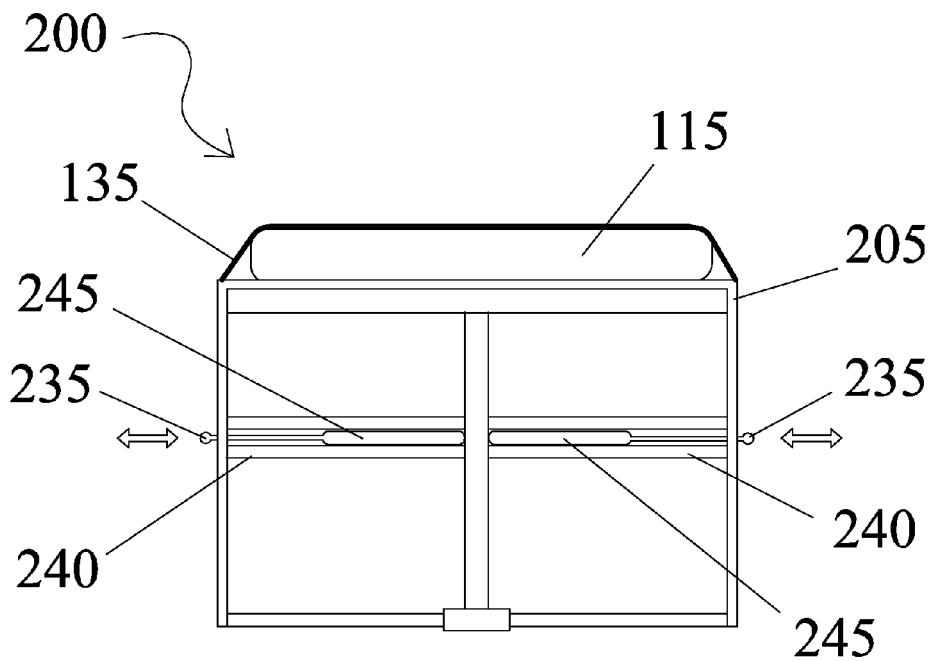
FIG. 9A is a top cutaway view of the personal media viewing device shown in FIG. 7.
Figure 9B:
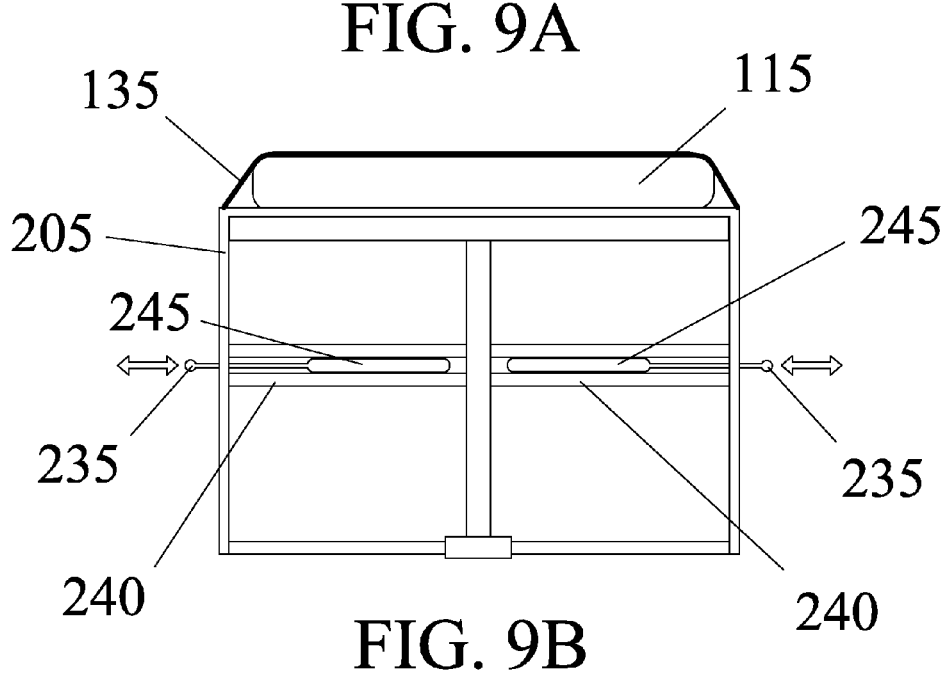
FIG. 9B is a top cutaway view of the personal media viewing device shown in FIG. 7.

Now referring to FIGS. 9A and 9B, personal media viewing device 200 utilizes two lenses 245 that moveably slide in a lens track 240. A lens mover 235 is provided to allow a user to adjust lenses 245 to the proper off-axis position to reduce headaches, eyestrain and other known side-effects of viewing personal media devices. The particular position selected depends on the individual user. While it is shown as adjusting each lens individually, they may be adjusted together using a linkage means (not shown). Other adjustment means besides lens mover 235 may be used such as but not limited to knobs, wheels, pulleys, etc. as is known in the art to provide movement of lenses 245.

Figure 10A:
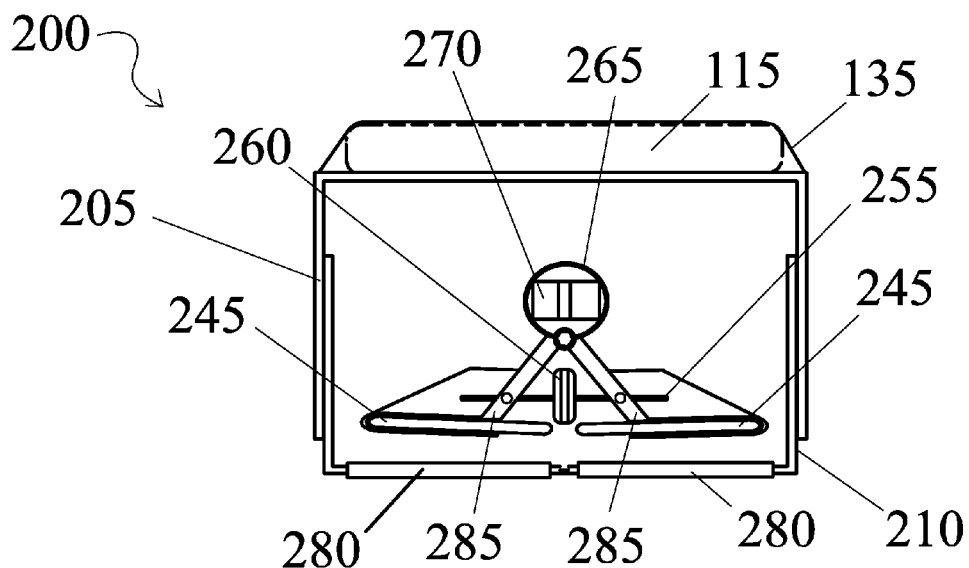
FIG. 10A is a top cutaway view of the personal media viewing device shown in FIG. 7 with an alternative lens moving means.
Figure 10B:
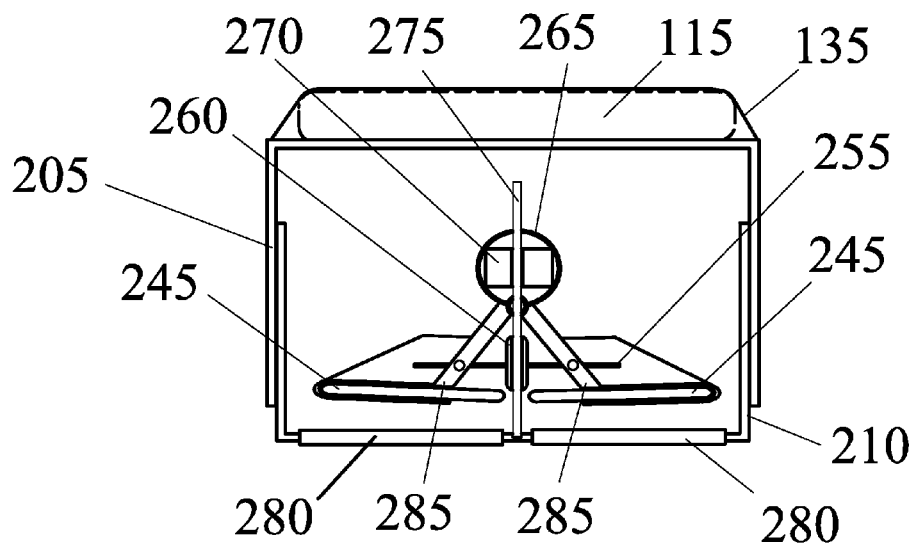
FIG. 10B is a top cutaway view of the personal media viewing device shown in FIG. 7 with an alternative lens moving means.
Figure 11:
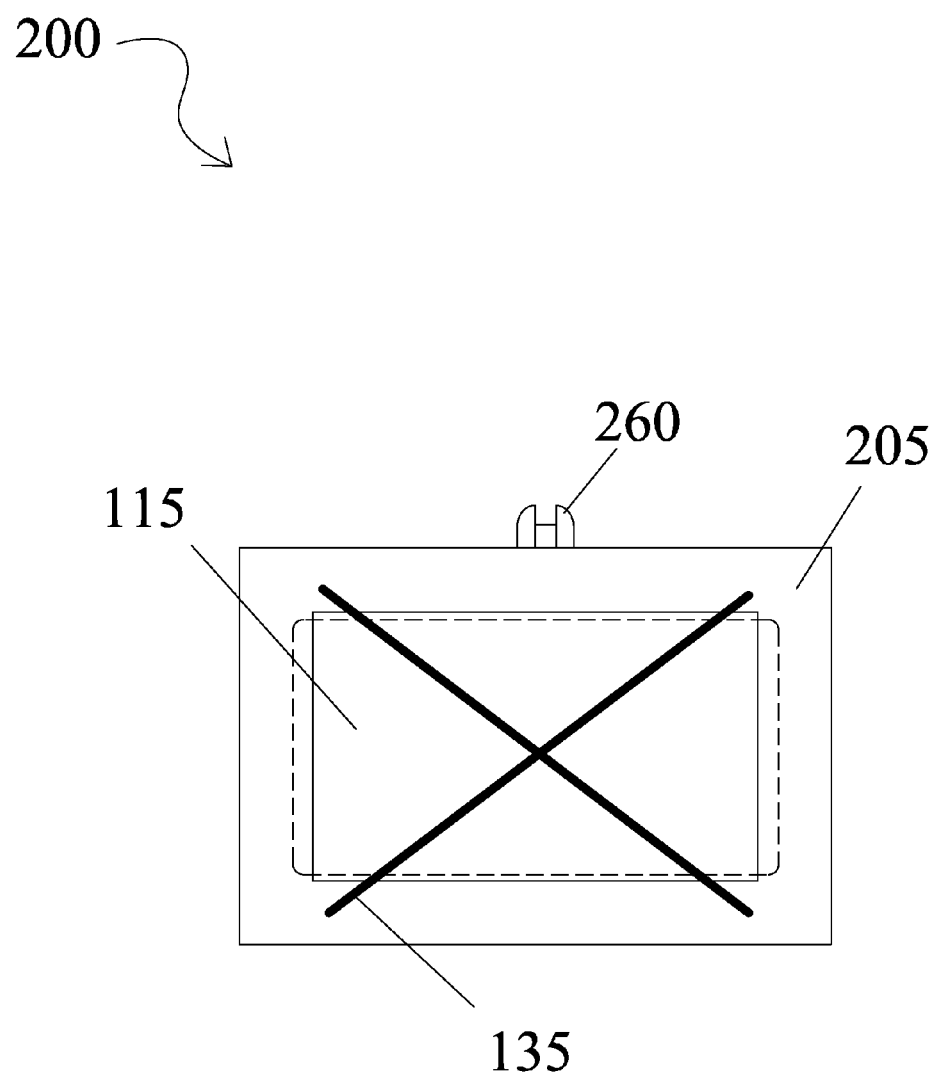
FIG. 11 is a front view of the personal media viewing device shown in FIG. 7.
Figure 12:
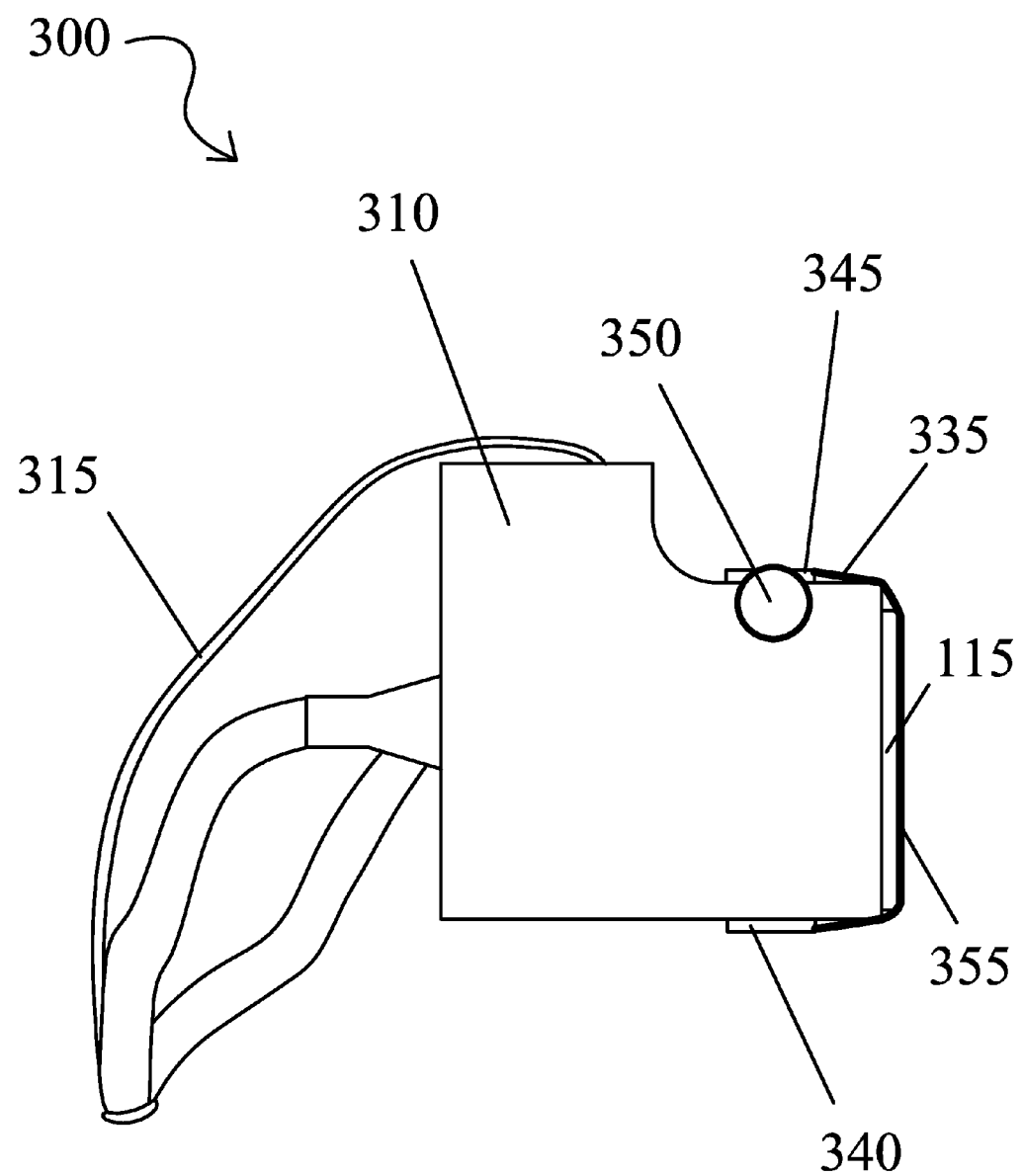
FIG. 12 is a side view of a personal media viewing device according to an embodiment of the invention.
Figure 13:
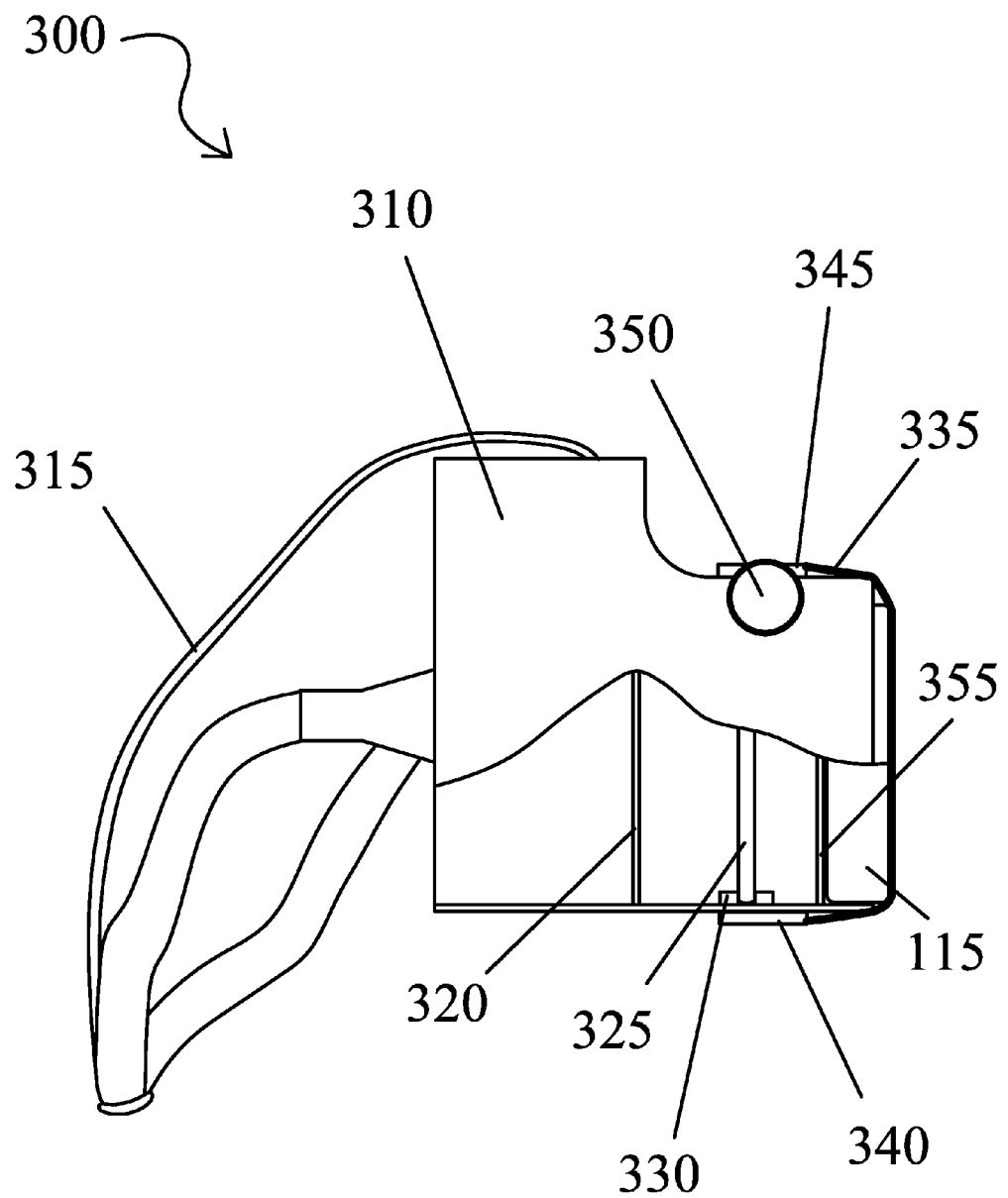
FIG. 13 is a cutaway side view of the personal media viewing device shown in FIG. 12.
Figure 14:
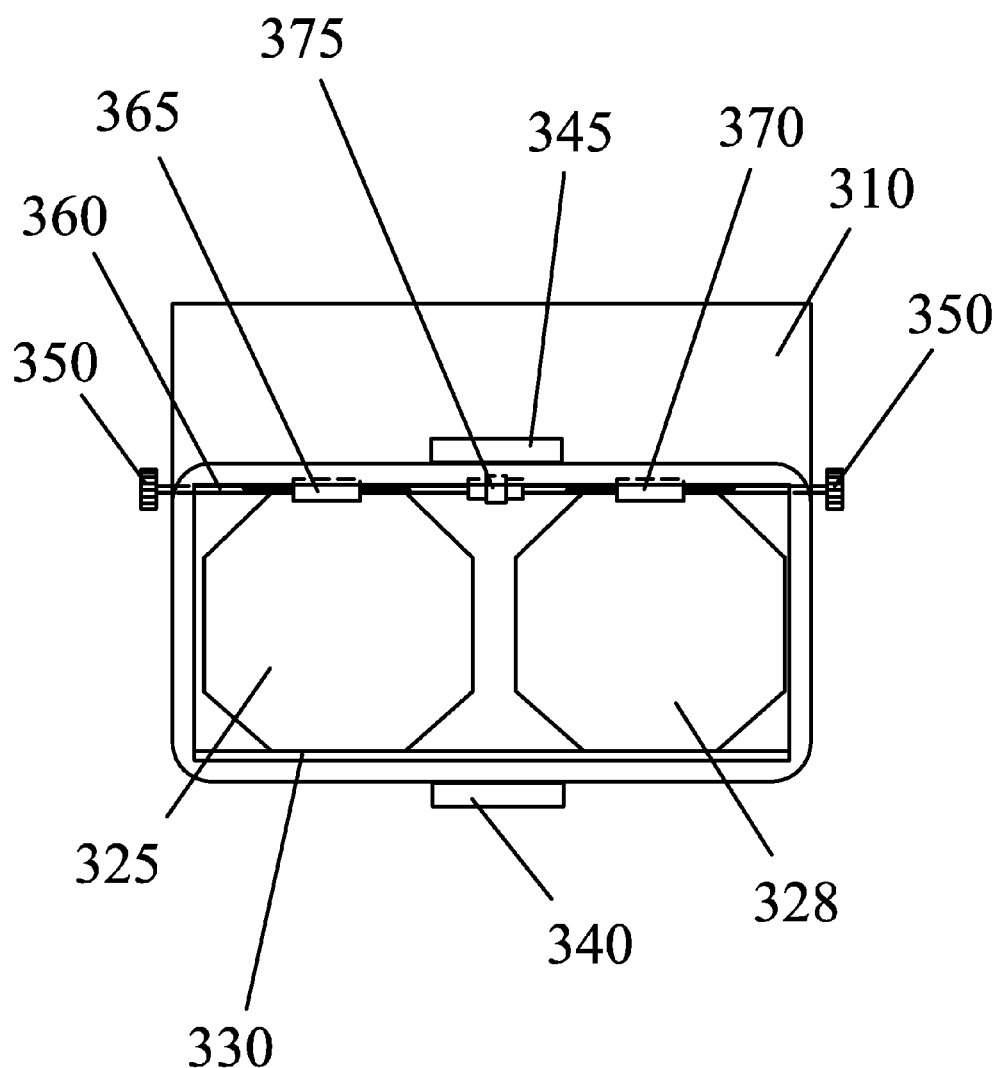
FIG. 14 is a front view of the personal media viewing device shown in FIG. 12.
Figure 15:
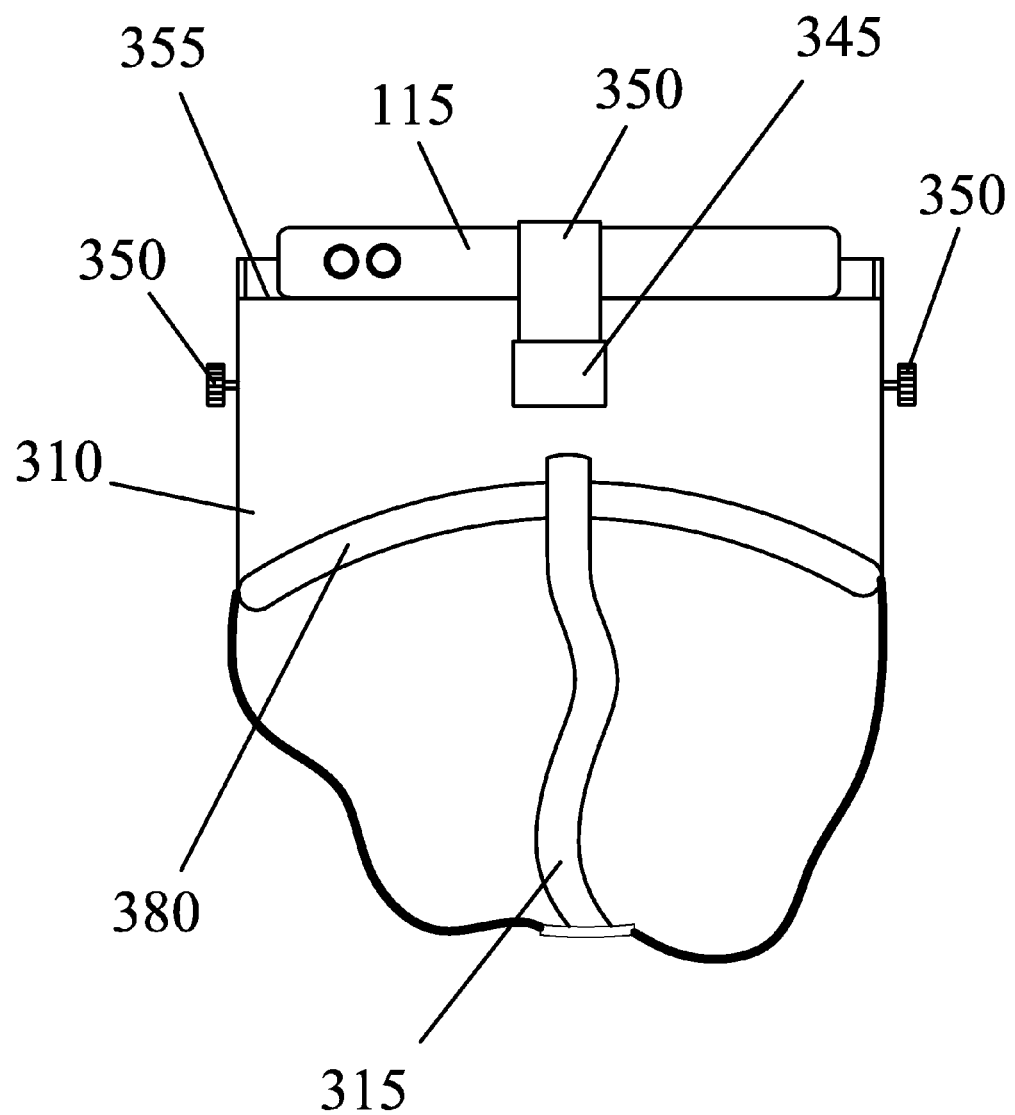
FIG. 15 is a top view of the personal media viewing device shown in FIG. 12.
Figure 16:
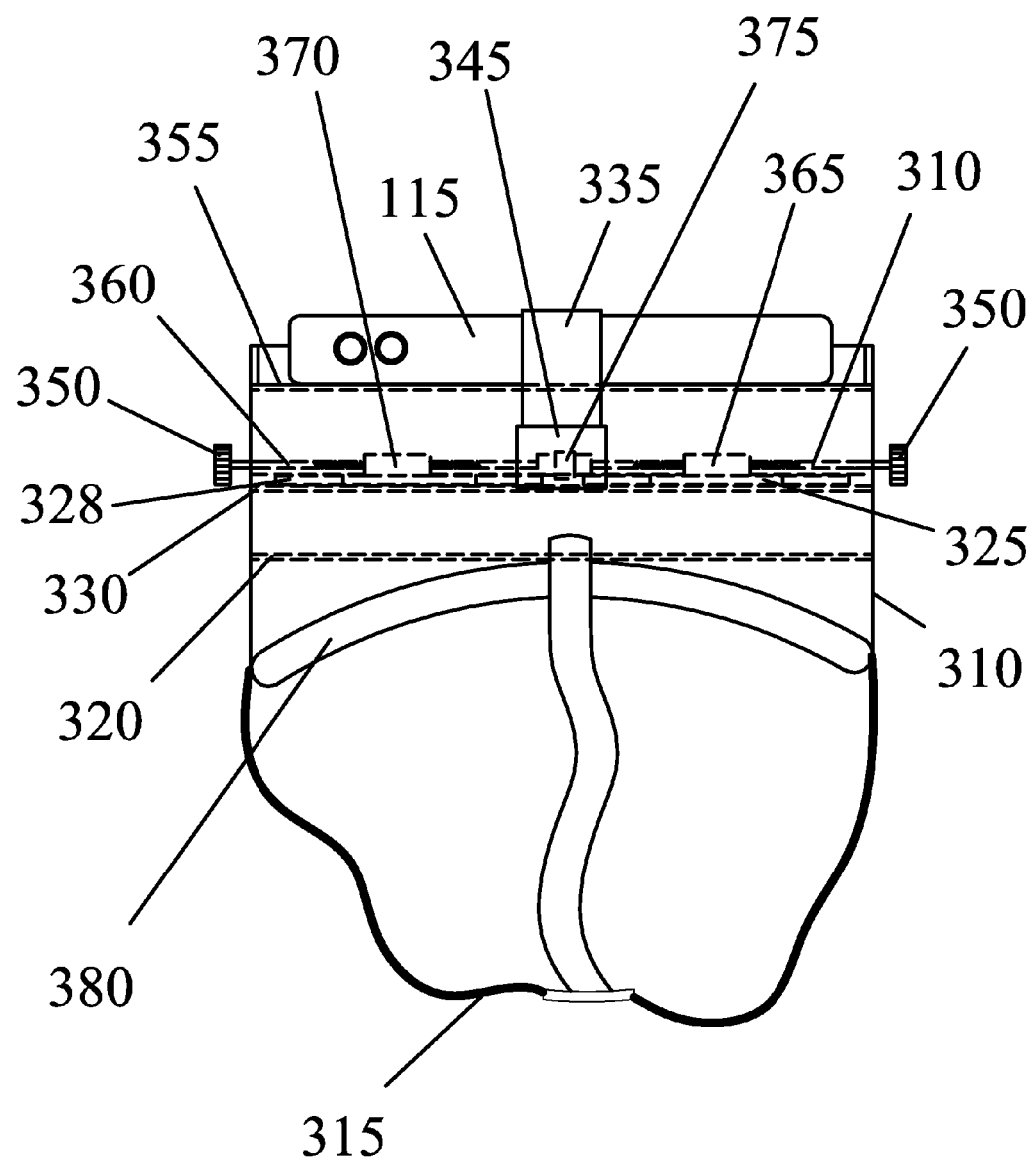
FIG. 16 is a transparent top view of the personal media viewing device shown in FIG. 15.

Referring to FIGS. 10A, 10B, and 11, the personal media viewing device 200 is shown having an alternative lens moving means. The lens moving means includes a pair of arms 285 connected to the lenses 245. An adjustment knob 260 is provided to turn an adjustment screw 255 which moves lenses 245 in an arc to provide the necessary adjustment of the lenses 245 in order to allow the user to select the best off-axis position to reduce eyestrain, etc. as discussed above. A biasing spring 265 is used to allow for smooth operation therein. A pair of viewing windows 280 are provided to enclose the interior of hood cap 205 and hood 210. Viewing windows 280 may be covered with a transparent material such as plastic or glass. Of course other methods of allowing movement of lenses 245 is possible as long as the user is able to adjust lenses 245 to a suitable off-axis position. Again, other movement embodiments are suitable such as a slide adjuster, lever, etc. as is known in the art.

Referring now to FIGS. 10B and 11, a divider 275 is provided to enhance 3D use. Divider 275 fits within a divider slot 270 disposed within biasing spring 265 and a slot in adjustment knob 260. Of course other configurations are possible to provide 3D use such, as but not limited to a flip up divider or one that can be inserted in an appropriate slot.

Now referring to FIGS. 12 through 16 and 18, a personal media viewing device 300 is shown having a frame 310 that supports head mounting straps 315. Head mounting straps are elastic and adjustable to fit different size heads as is known in the art. Frame 310 has two protective inserts, an inner protective insert 320 and an outer protective insert 355. These inserts keep the lenses 325 and 328 clean and protected. Left lens 325 and right lens 328 rest in a track 330 that allows them to move back and forth in a lateral motion. A lens adjustment knob 350 on either side of translating screw shaft 360. Both left lens 325 and right lens 328 are moveably attached to translating screw shaft 360 using a right lens traveling nut 365 and a left lens traveling nut 370. Translating screw shaft 360 is threaded in an opposite direction for each portion that interacts with each lens traveling nut (365 and 370) which cause the lenses (325 and 328) to move in opposite directions when lens adjustment knob 350 is turned.

A center support 375 provides support for translating screw shaft 360. As lens adjustment knob 350 is rotated, lenses 325 and 328 move laterally inward or outward to provide the correct amount of off-center focusing to reduce eye strain. Frame 310 is light blocking to isolate ambient light from the viewing area. An opaque plastic is used in the embodiment shown, but any suitable light blocking material may be used.

Of course other methods of adjusting lens 325 and 328 may be used such as two separate translating screw shafts wherein each lens is independently operable. In such an embodiment, center support 375 would hold each free end of the two separate translating screw shafts. In all other ways, such an embodiment would operate as discussed above.

Both right lens 325 and left lens 328 are overhead projector type Fresnel lenses consisting of two Fresnel lenses positioned optic side to optic side as is known in the art. Of course, regular optic lenses may be used as well, but generally add to the cost of production. The center of the lens is generally positioned slightly inward of the user's center of vision to reduce eyestrain when viewing personal media devices smaller than six inches and slightly outward of vision center when viewing devices larger than six inches such as tablet devices. An attachment strap 335 is used to hold personal media device 115 in place while viewing. As discussed above, attachment strap 335 is elastic and adjustable to hold different sized devices. Of course other attachment means may be used such as, but not limited to, brackets, belts, snaps, hook and loop fastener, etc. as long as the device is held securely during use. In the embodiment shown, a lower strap anchor 340 and an upper strap anchor 345 is used to secure attachment strap 335 to frame 310.

As discussed above, lens adjustment knob 350 is used to move lenses (325 and 328) laterally to allow a user 390 to find the best off-axis position to reduce eyestrain and to provide a pleasant viewing experience. A headrest portion 380 is used to comfortably fit frame 310 against a user's forehead. Headrest portion 380 is elastic and pliant to provide maximum comfort while in use.

Figure 17:
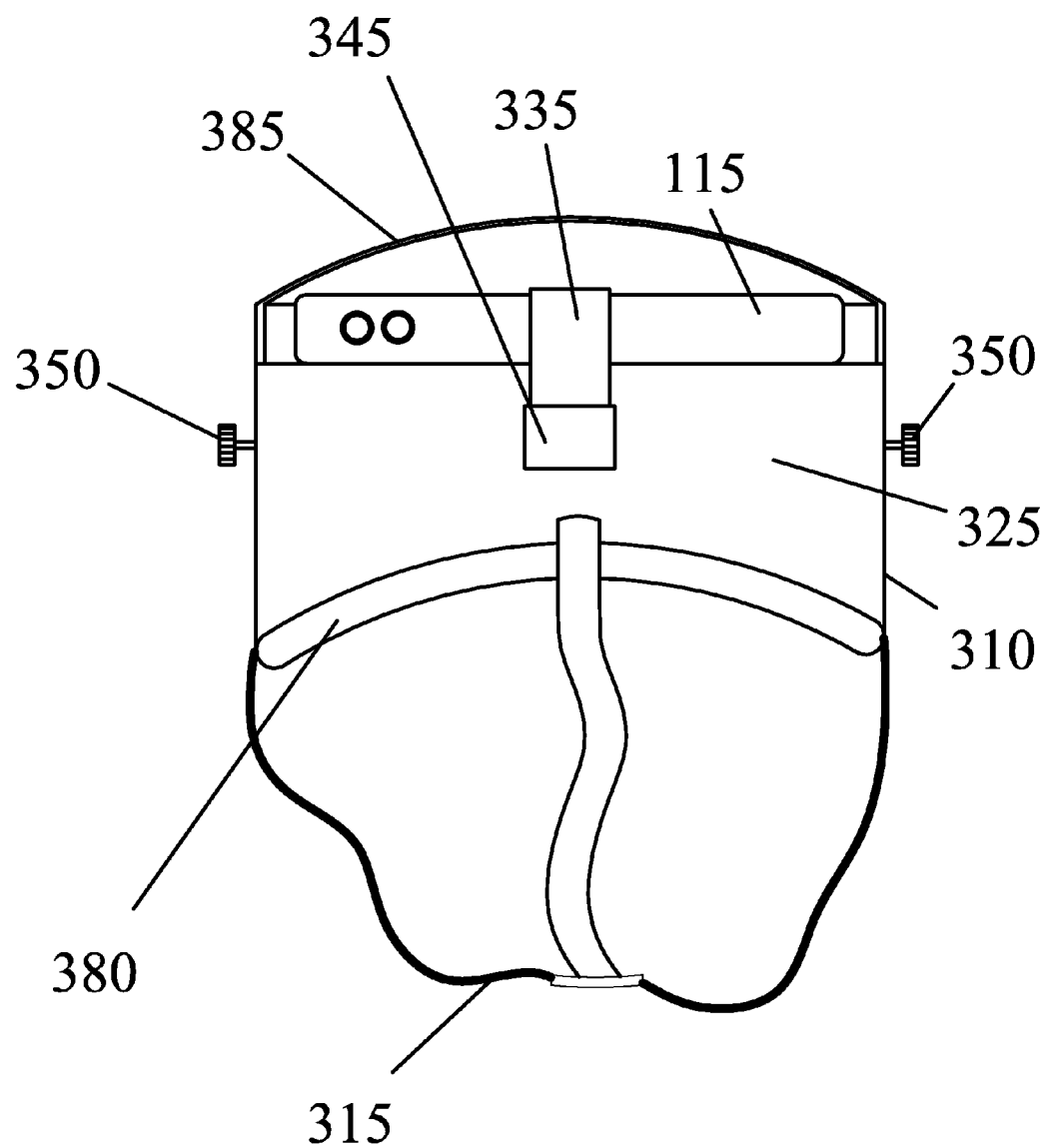
FIG. 17 is a top view of the personal media viewing device shown in FIG. 12 with a protective shield attached.
Figure 18:
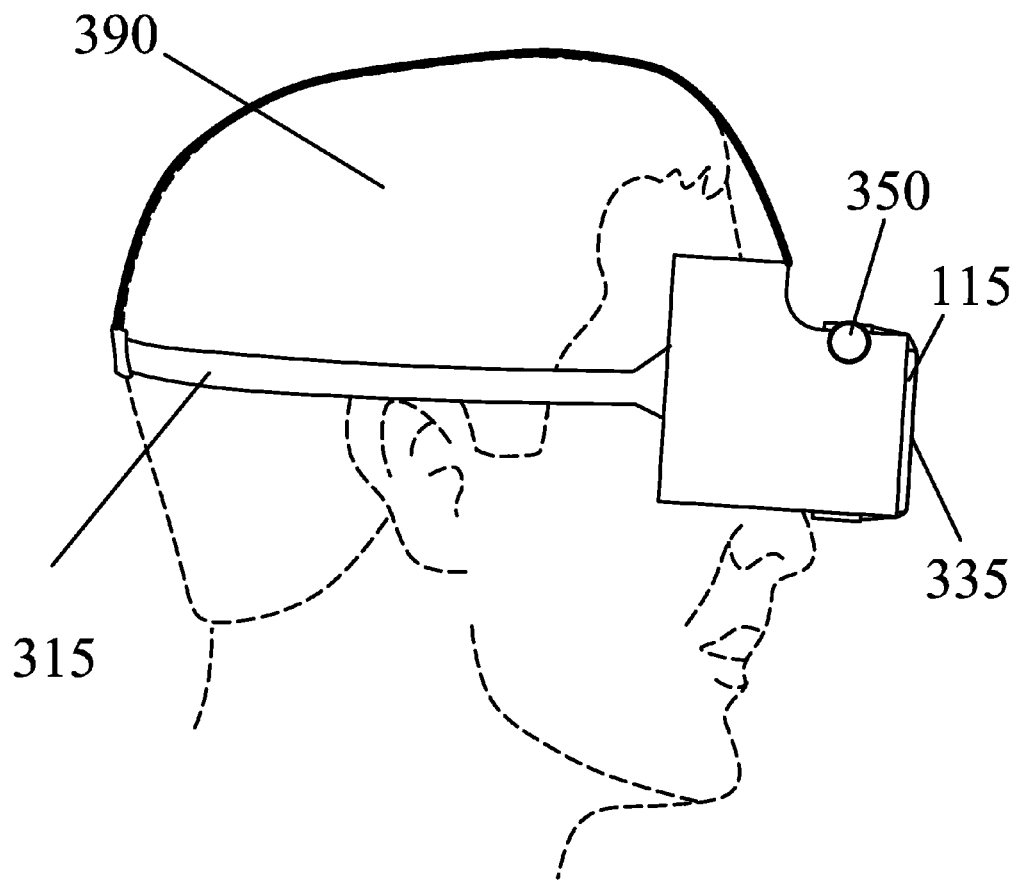
FIG. 18 is a side view of the personal media viewing device as worn by a user.

Now referring to FIG. 17, a protective shield 385 is provided to give extra security while in use by shielding personal media device 115 and to catch it should attachment strap 335 fail. Protective shield 385 is a clear plastic, but could be made of any other suitable material.

Figure 19:
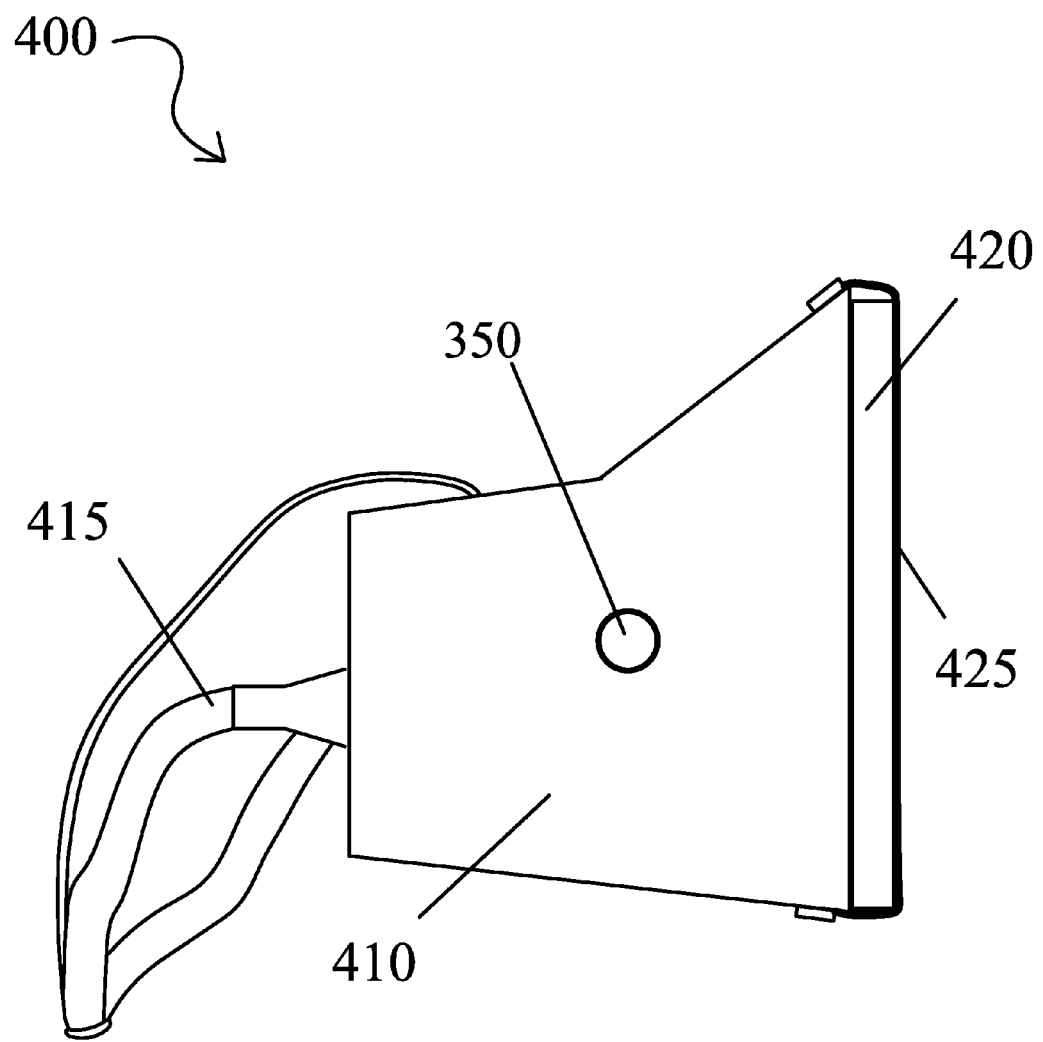
FIG. 19 is a side view of a personal media viewing device for use with a tablet device according to an embodiment of the invention.

Referring now to FIG. 19, a personal media viewing device 400 is shown modified to allow a tablet type device 420 to be used as the viewing device. In general, tablet devices have a larger viewing screen, and therefore need a lager attachment area as well as a being adjusted for a different off-axis viewing position to reduce eyestrain. A frame 410 is larger in size compared with the device used for smaller devices. Head straps 415 attach in the same manner as discussed above as known in the art. A longer attachment strap 425 is used to hold tablet device 420 in place while in use.

Although the instant invention has been described in relation to particular embodiments thereof, many other variations and modifications and other uses will become apparent to those skilled in the art.

What is claimed is:

1. A personal media viewing device comprising:
a frame;
a track secured to a lower inside portion of said frame;
a pair of lenses moveably secured within said track;
a pair of lens traveling nuts secured to each of said pair of lenses
a lens adjustment knob secured to a translating screw shaft 360;
said translating screw shaft adapted to interact with said pair of lens traveling nuts; wherein said pair of lenses are adjusted to a selected position when said lens adjustment knob is turned;
said translating screw shaft having oppositely threaded portions whereby each lens translates horizontally within said track and in an opposite direction from each other when said lens adjustment knob is turned;
said frame having a front portion adapted to hold a personal media device and a back portion that is adapted to fit against a user's forehead;
an attachment means for removably securing said personal media device to said front portion; and
a head attachment means for securing said personal media viewing device to a user's head wherein hand's free operation is provided.

2. The personal media viewing device according to claim 1, wherein said frame has a headrest portion disposed along said back portion that is shaped to match a forehead portion of a human head.

3. The personal media viewing device according to claim 2, wherein said headrest portion is foam covered to provide comfort.

4. The personal media viewing device according to claim 1, further comprising:
an inner protective insert disposed between said pair of lenses and said back portion wherein said lenses are protected on an inward facing portion; and
an outer protective insert disposed between said lenses and said front portion wherein said lenses are protected on an outward facing portion.

5. The personal media viewing device according to claim 1, further comprising a center support disposed along a centrally located portion of said translating screw shaft wherein said traveling screw shaft is centrally supported.

6. The personal media viewing device according to claim 1, wherein said attachment means for removably securing a personal media device is an elastic strap.

7. The personal media viewing device according to claim 1, wherein said attachment means for removably securing a personal media device is a strap having a hook and loop fastening portion releasably attached to a joining portion disposed on an appropriate location on said frame.

8. The personal media viewing device according to claim 1, wherein said head attachment means for securing said personal media viewing device to a user's head comprises:
an elastic top strap;
a fight and left elastic strap joined to said top strap and secured to a right and left portion of said frame at an appropriate location disposed on said back portion of said frame;
an adjustment buckle operably adapted to adjust the length of said head attachment means whereby said head attachment means is adjustable to fit different users.

9. The personal media viewing device according to claim 1, further comprising a protective shield disposed across said front portion whereby said personal media device is further protected during use.

10. The personal media viewing device according to claim 1, wherein said pair of lenses are Fresnel lenses.

11. The personal media viewing device according to claim 1, wherein said pair of lenses are optical glass lenses.

12. The personal media viewing device according to claim 1, wherein said pair of lenses are plastic lenses.

* * * * *